United States Patent Office 3,843,387
Patented Oct. 22, 1974

3,843,387
PROCESS FOR COATING A SUPPORT WITH A POLYAMIDE PLASTIC MATERIAL
Michel S. Lefebvre, 39 Rue du Cardinal Saliege, 02-Saint-Quentin, aisne, France
No Drawing. Continuation-in-part of abandoned application Ser. No. 15,946, Mar. 2, 1970. This application Aug. 28, 1972, Ser. No. 284,100
Claims priority, application France, Mar. 12, 1969, 6907008
Int. Cl. B44d 1/44; B44c 1/04
U.S. Cl. 117—62.2
3 Claims

ABSTRACT OF THE DISCLOSURE

A process for coating a support with a polyamide plastic material, wherein the support is coated with an ionic acid solution of a polyamide paste, and then the solution is made to coagulate by pulverizing on the coated support a salt such as a sodium phosphate of an acid weaker than the acid of the solution. The process may be used, for example, in the coating of panels made of wood or agglomerated fibers, thereby producing decorative surfaces which do not require painting or additional coating.

---

This application is a continuation-in-part of application Ser. No. 15,946, filed Mar. 2, 1970, now abandoned.

This invention relates to a process for depositing plastic material on a support; such process is employed in particular in the manufacture of decorative panels.

In their Patent Application filed in France on Dec. 6, 1968 for a "Process of Obtaining New Materials and Products Obtained Therefrom," now French Pat. No. 1,602,721, published Jan. 18, 1971, the Applicant proposed a new process having multiple applications. The present invention constitutes at least one of these applications in that it discloses a new process for coating surfaces of all natures, by means of plastic material.

There are already various processes in existence which are used particularly for decorative purposes, such processes enabling a support to be coated with a plastic material. A certain number of these processes use pre-fabricated sheets of plastic material which are then made to adhere to a support. On the contrary, others directly cover the support with a plastic material, this operation generally being effected under temperature and pressure conditions which are different from the ambient conditions leading to finished products that may be used for producing furniture, partitions, etc., without its being necessary to decorate them later.

The present invention belongs to this second category of coating procedures, but proposes a new process which is carried out without special equipment, under the ambient conditions of temperature and pressure. In addition, due to its high speed of execution, the new process enables products to be obtained which are of a lower cost price.

The invention therefore has among its objects the provision of a process for coating a support by a polyamide plastic material, according to which the support is coated with an ionic acid solution preferably in the form of a polyamide paste, then the solution is caused to coagulate by pulverizing on the coated deposit a salt of an acid which is weaker than that of the ionic solution.

The ionic acid solution of a polymer will be of the type such as that described in the above-mentioned French Patent, that is to say, it will contain monomeric units having both at least one hydrogen of acid character and at least one acid radical bonded with a carbon by a bond of electrovalent type. As was explained in said French Patent, such a solution contains monomeric units which later may be polymerized or coagulated.

In the particular case of the present invention, the monomeric units are amides and the coagulation is obtained by means of a salt, for example a mono- or di-ammonium or a sodium mono-, di- or tri-phosphate, whose granulometry will be responsible for the fineness or roughness of the final coating.

On the other hand, dyes, in particular pigments or acid dyes such as those known commercially as "Kiton," may be added to the solution before the support is coated.

EXAMPLE I

A coating was produced on a large number of wood supports from a solution comprising 300 cc. hydrochloric acid at 22° Baumé, 200 cc. water, and 200 g. of 6 "Lilion" polyamide. "Lilion" is the well-known commercial name for polycaprolactam. According to the conditions of ambient temperature, this solution becomes homogeneous and pasty; it may be used within a period of time between 5 minutes and 2 hours. After the support has been coated with agglomerate particles or the like, a mono- or di-ammonium phosphate is pulverized and is spread upon the coating. Coagulation is almost instantaneous, and the coating hardens without delay.

The resulting product is a support coated with a film of plastic material with a granite-like appearance, the fineness of which depends upon the granulometary of the phosphate. If desired, washing may then be carried out with a basic solution, so as to eliminate any trace of acid from the coating and to increase its hardness. Too great a shrinkage of the plastic film upon drying is also thereby avoided.

EXAMPLE II 45 kg. of polyamide 6 "polycaprolactam" was dissolved in 95 kg. hydrochloric acid 11 N. At the end of dissolution (2 hours at ambient temperature), the solution was filtered and the viscosity was adjusted to the desired value with the aid of hydrochloric acid 11 N. The solution was injected into the circuit of a curtain coating apparatus. The supports to be covered, for example, sheets of lignocellulosic materials, were then coated with the solution; in general, in order to obtain a correct covering 1 kg. of solution was deposited per square meter. Pulverized trisodium phosphate was deposited on the layer of solution, at a rate of 1 to 2 kg. per square meter. The coating was then allowed to coagulate for 1 hour at ambient temperature, and then the excess salt was brushed off.

EXAMPLE III

Under the same conditions as in Example II, 45 kg. of nylon 66 (polycondensate of hexamethylene diamine and adipic acid) was dissolved in 95 kg. of hydrochloric acid 11 N, the solution being coated upon a panel. Coagulation of such coating was obtained by means of pulverized trisodium phosphate. The result was the same as in Example II.

EXAMPLE IV

A similar result obtained by dissolving 50 kg. of nylon 2 (polyglycine) in 100 kg. of hydrochloric acid 5 N, the solution being coated upon a panel. Coagulation of the coating was obtained by means of pulverized trisodium phosphate.

EXAMPLE V 20 kg. of polyamide 11 was dissolved in 70 kg., of nitric acid at 36° Baumé The solution thus obtained was used under the conditions indicated in Example II; the coagulation was provoked by pulverized trisodium phosphate.

The coatings obtained in the various Examples I–V above have properties which have already been mentioned in the French Application mentioned hereinabove, in particular a semi-permeability, and a considerable resistance to various chemical agents.

In this respect, it should be noted that the chemical resistance of the coating is higher than of the polymers introduced into the starting solution. The advantage of the process according to the invention over similar processes such as those calling upon the transfer of the polyamide may thus be readily appreciated.

In addition, the specific properties of salt, for example, the resistance to flame in the case of ammonium phosphates, are transferred to the whole of the coating and may consequently contribute to the efficient protection of the support. It is to be noted that ammonium phosphate may be substituted for the various sodium phosphates employed in the above examples.

On the other hand, it should be emphasized that the coagulation of the solution reduces the crosslinking of the polymers reconstituted from the monomeric units contained in the solution. Therefore, if this solution comprises dyes, the coating is colored in its mass, thus preventing any aging or degradation of its appearance. Of course, for certain artistic or decorative applications, it is possible to coat the support with a plurality of layers of colored solutions in different ways, before or after coagulation by pulverizing a salt.

Finally, as the hardness of the coating is adjustable by the composition of the solution, the nature of the salt and the possible washing treatment, it is possible to provide a pumicing of the coating after its manufacture.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. A process for coating a support with a polyamide plastic material, comprising coating the support with an ionic acid polyamide solution in the form of a paste and then coagulating the coating by spreading on the coated support a pulverized salt chosen from the group consisting of mono-ammonium phosphate, di-ammonium phosphate, mono-sodium phosphate, di-sodium phosphate and tri-sodium phosphate.

2. A process for coating a support with a polyamide plastic material, comprising coating the support with an ionic acid polycaprolactam solution in the form of a paste and then coagulating the coating by spreading on the coated support a salt of an acid weaker than that of the polycaprolactam solution.

3. A process as claimed in claim 2, wherein the salt is chosen from the group consisting of mono-ammonium phosphate, di-ammonium phosphate, mono-sodium phosphate, di-sodium phosphate and tri-sodium phosphate.

References Cited

UNITED STATES PATENTS

| | | | |
|---|---|---|---|
| 1,875,054 | 8/1932 | Loetscher | 117—33 |
| 2,056,406 | 10/1936 | Mayne | 117—42 |
| 2,185,217 | 1/1940 | Moore | 117—33 |
| 2,684,305 | 7/1954 | Quinlivan | 117—33 |
| 2,952,562 | 9/1960 | Morris et al. | 117—62 |
| 3,202,531 | 8/1965 | Dowd et al. | 117—62 |
| 3,248,254 | 4/1966 | Zenit et al. | 117—33 |
| 3,272,645 | 9/1966 | Duhoo | 117—33 |
| 3,368,912 | 2/1968 | Adamis | 117—42 |
| 3,402,093 | 9/1968 | Riva | 117—33 |
| 3,526,531 | 9/1970 | Asano et al. | 117—62.2 |
| 3,577,257 | 5/1971 | Hutzler et al. | 117—33 |
| 3,697,437 | 10/1972 | Fogle et al. | 117—62.2 |

MICHAEL SOFOCLEOUS, Primary Examiner

U.S. Cl. X.R.

117—33, 42, 62.1, 62.2, 161 P, 148, 137, 140 A